March 27, 1951      A. M. STONER      2,546,351
TOGGLE-ACTING COLLET
Filed Dec. 31, 1947      2 Sheets-Sheet 1
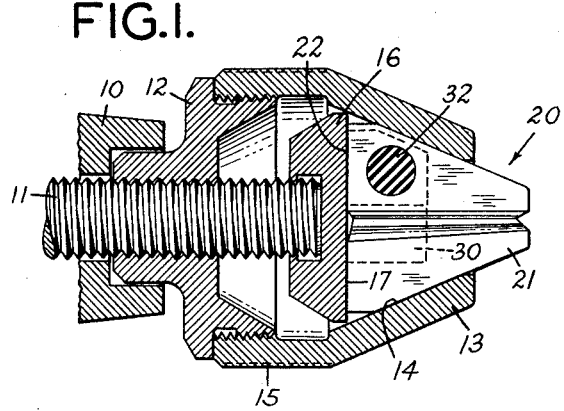
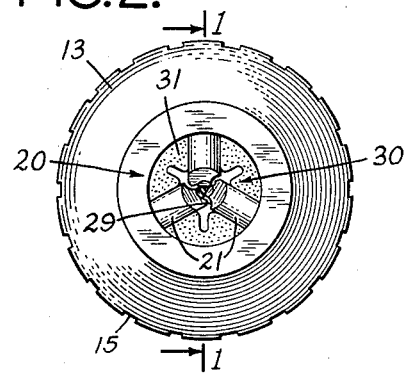
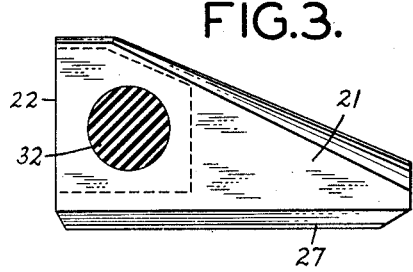
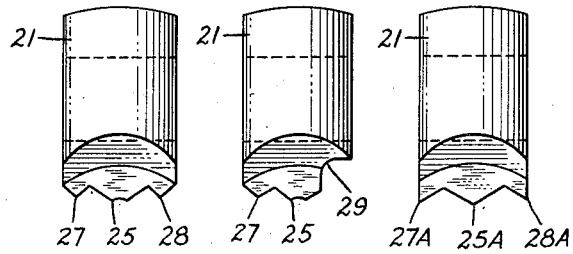
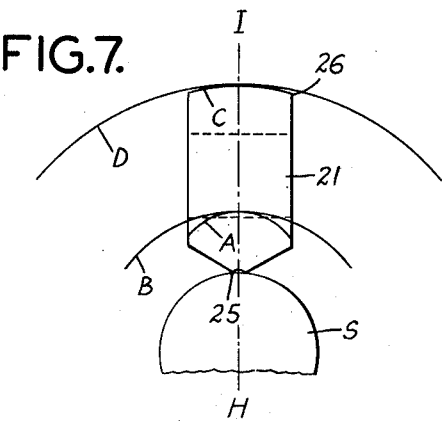
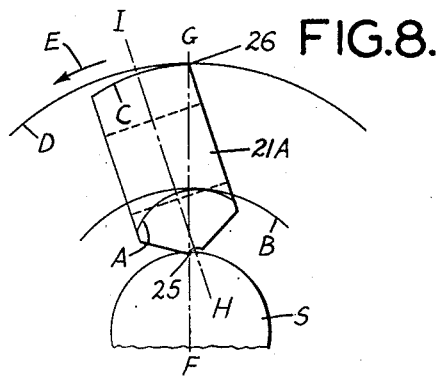
INVENTOR.
ARTHUR MERRICK STONER
BY
E. W. Marshall
ATTORNEY.

March 27, 1951 A. M. STONER 2,546,351
TOGGLE-ACTING COLLET

Filed Dec. 31, 1947 2 Sheets-Sheet 2

INVENTOR.
ARTHUR MERRICK STONER
BY
E. W. Marshall
ATTORNEY.

Patented Mar. 27, 1951

2,546,351

UNITED STATES PATENT OFFICE 2,546,351

TOGGLE-ACTING COLLET

Arthur Merrick Stoner, West Hartford, Conn., assignor to The Jacobs Manufacturing Company, Hartford, Conn., a corporation of Connecticut Application December 31, 1947, Serial No. 794,892

14 Claims. (Cl. 279—53)

This invention relates to an improved toggle-acting collet, and its object is to provide a collet with gripping members and associated parts of simple construction, which is so designed and arranged that the resistance of a tool held in a chuck which is provided with a collet embodying this invention, to the turning movement of the chuck, will increase the grip on the tool and in which the amount of the toggle action which increases this grip is limited.

In an application for patent, Ser. No. 702,165, which I filed on October 9, 1946, now abandoned, I showed a collet which embodies the present invention, and the present application is filed for the purpose of amplifying the description of the construction and the operation of the collet disclosed in the aforesaid application, and of defining its novel features in claims.

Referring to the drawings,

Fig. 1 is a sectional side elevation of one form of chuck of which my novel collet is a part. The section in this figure is taken on the line 1—1 of Fig. 2;

Fig. 2 is a front elevation of the chuck shown in Fig. 1;

Fig. 3 is a side elevation of one of the gripping members of the collet shown in Figs. 1 and 2. The base of a body of resilient material which interconnects the gripping members is shown in dotted lines, and a part of the resilient material is shown in section in this figure;

Fig. 4 is an end elevation of the gripping member shown in Fig. 3, with the resilient material omitted;

Fig. 5 is an end elevation of a gripping member of modified construction; and Fig. 6 is a similar view of a gripping member of a further modified construction;

Fig. 7 is a diagrammatic front elevation of a part of a cam member, an article to be engaged and an interposed gripping member of former construction;

Fig. 8 is a similar view of the parts shown in Fig. 7, in different relative positions illustrating the operation;

Figure 9:
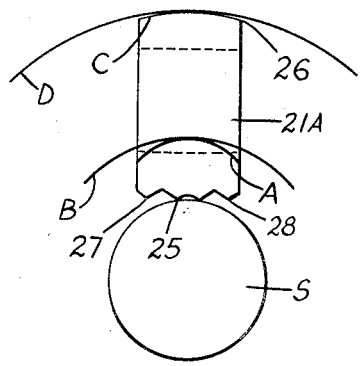
Fig. 9 is a view similar to Fig. 7, with a gripping member which embodies my improved construction interposed between the cam member and the engaged article.
Figure 10:
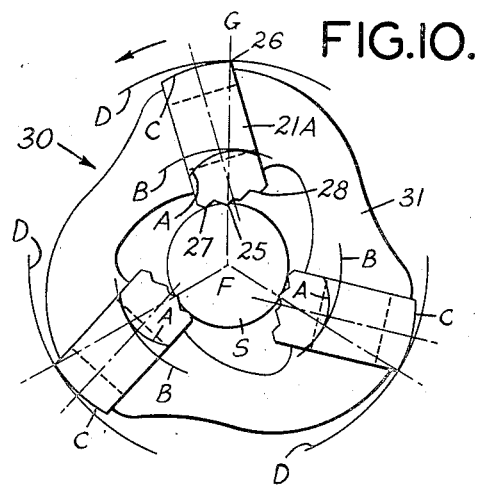
Figure 12:
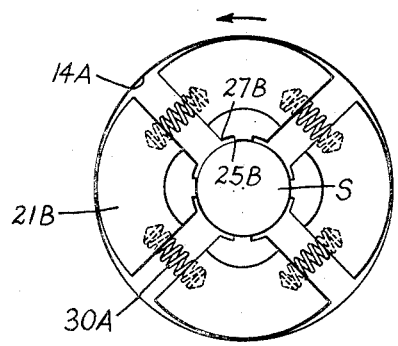
Figure 11:
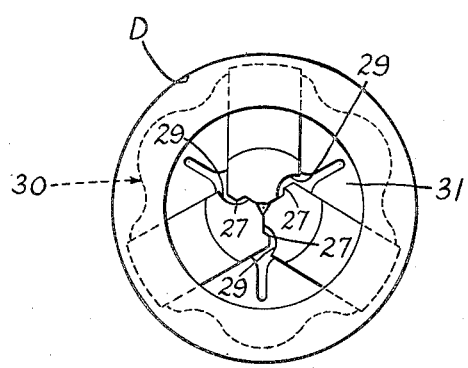
Figure 13:
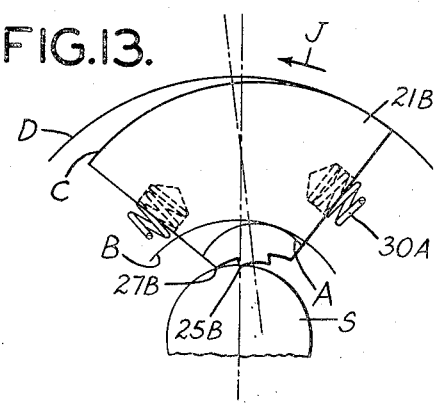

Fig. 10 is a diagrammatic front elevation of the cam member, the gripped article and three interposed gripping members like that shown in Fig. 9, tilted by the torque imposed upon them by the rotation of the cam member. In this figure, the resilient material which interconnects the gripping members is shown with the parts which are between the gripping members in the form into which they are distorted when the gripping members are tilted;

Fig. 11 is a diagrammatic front elevation, showing gripping members of the modified form shown in Fig. 5 but with flat gripping surfaces in the positions which they assume when the collet is closed. The parts of the resilient material between the gripping members are shown in this figure folded outwardly into the form which they assume when the collet is closed;

Fig. 12 is a diagrammatic front elevation of another type of collet with my invention embodied therein; and Fig. 13 is a diagram illustrating the operation of the parts shown in Fig. 12.

10 designates the end of a tool, such as a drill, from which a rotatable externally threaded spindle 11 projects. 12 is the body member of a chuck. This is internally threaded to fit the spindle 11 so that, by imparting a relative rotation between this body and the spindle, the position of the body on the spindle may be adjusted. 13 is a cam member threaded into tight engagement with the body 12 and having an internal cone-shaped cam surface 14. Preferably, the outer surface of the member 13 is fluted, as shown at 15, to facilitate the adjustment of the chuck on the spindle 11. 16 is a thrust block, the rear end of which abuts the end of the spindle 11. The front end of this block is a flat surface 17, which is normal to the axis of the chuck.

In Figs. 1 and 2, 20 designates a collet, which is interposed between the thrust block 16 and the cam surface 14. This comprises a plurality of gripping members 21 of rigid material radially and symmetrically disposed about a common axis and interconnected by a body 30 of resilient material, such as oil-resistant synthetic rubber, in the manner disclosed in my Patent No. 2,346,706, issued August 18, 1944. In the specific form illustrated, three flat-sided gripping members are shown, and the parts of the resilient material between the gripping members are in the form of foldable struts 31 based upon adjacent sides of proximate gripping members. These struts buckle outwardly when the collet is closed. Parts of the resilient body pass through openings in the gripping members, as shown in section in Figs. 1 and 3 at 32. Structures of this kind are shown in my copending applications for patents, Ser. Nos. 521,097, now Patent No. 2,459,899, and 600,550, now Patent No. 2,459,900, filed respectively February 4, 1944, and June 20, 1945. In the chuck shown in Figs. 1 and 2, the collet is compressed by screwing the body 12 onto the spindle 11. The outer surfaces of the gripping members conform to the cam surface 14 when the collet is closed. The rear ends of the gripping members, designated by the reference numeral 22, are normal to the axis of the chuck and are adapted to engage the flat surface 17 of the thrust block 16.

When the collet 20 is not completely closed, the outer surfaces of the gripping members near the forward ends thereof, which is represented by the arc A in Figs. 7-10, rests upon a part of the cam surface represented by the arc B in the same figures. The radius of the arc A is less than that of the arc B. The outer cam-engaging surfaces of the gripping members near the rear ends thereof, represented by the arc C in Figs. 7-10, rest upon parts D of the cam surface, of flatter curvature.

Referring now to Fig. 7, and assuming that the parts are at rest, and that the gripping member 21 is tightened between the cam surface and the shank S of a drill or other tool, it will be seen that when the cam member is turned in an anti-clockwise direction, as indicated by the arrow E in Fig. 8, the gripping member will be tilted out of its radial position as a result of the torque produced by the resistance to turning of the shank in drilling, toward the position in which it is shown at 21A in Fig. 8. The latter figure shows that this produces a toggle action, which tends to force the gripping edge 25 of the gripping member into the surface of the shank S. The pressure on the shank increases until the gripping edge 25 reaches the line F—G, which passes through the axis of the shank, through the gripping edge 25, and the point 26 on the line of contact between the gripping member and the cam surface. The gripping edge 25 and the point 26 are on opposite sides of and are laterally spaced from a radial plane H—I through the center of the gripping member. If the gripping edge 25 passes to the right beyond the line F—G, or if the point 26 passes to the left of the line F—G, the toggle effect is broken, and the pressure of the gripping member on the shank is released. A similar arrangement is shown in Patent 1,894,515, issued to M. P. Hubbell January 17, 1933.

According to my invention, the inner edge of the gripping member is provided with projecting ribs 27, 28 (Figs. 4, 9 and 10), laterally spaced from and parallel with the inner gripping edge 25. When the gripping members are tilted by the rotation of the cam and the resistance of the turning movement of the shank S, as shown in Fig. 10, the rib 27 engages the surface of the shank and prevents the gripping edge 25 of the gripping member from going beyond the dead center of the toggle. The engagement of the rib 27 with the shank further increases the gripping of the collet upon the shank. It will be noted that this desired effect is greater on shanks of larger diameter, where it is most needed, than it is on smaller shanks.

It is desirable to make the gripping edge 25 sharp for better engagement with the shank S.

In order to increase the capacity of the collet to engage shanks of a greater range of size, a part of the inner surface of each gripping member may be cut away, as shown at 29 in Figs. 2, 5 and 11, to provide a clearance for the rib 27 of the adjacent gripping member so that the collet may be closed, as shown in Fig. 11, to engage a shank of small diameter.

In Fig. 6 a modification is illustrated in which the tool engaging ribs 27A, 28A are at the edges of the gripping members and the inner gripping edge 25A is brought down to a line. In all of the forms shown in Figs. 4, 5 and 6, the ribs 27, 28 and 27A, 28A are further removed from the center of the collet than the inner gripping edges 25 and 25A. The inner surfaces of the gripping members, as shown in Figs. 4, 5, 7-10, are arcuate but they may be flat, as shown in Figs. 2 and 11.

Figs. 12 and 13 show the invention applied to a chuck of another type. In this case there are four gripping members 21B of substantially segmental cross section, between which are metallic springs 30A. The outer surfaces of the gripping members, represented in Fig. 13 by the arc C, engage a cone-shaped cam surface 14A (Fig. 12), a part of which is represented in Fig. 13 by the arc D. This arc D has a greater radius than that of the arc C. According to my invention, a gripping edge 25B parallel with the axis of the chuck is provided on each gripping member, laterally offset from a radial plane through the axis of the chuck and the center of the gripping member.

When the shank S is engaged by the gripping members, and the chuck is rotated in the direction indicated by the arrow J in Fig. 13, this rotation and the resistance of the shank to rotate will tend to tilt the gripping members, as shown in Fig. 13, thus forcing them into tighter engagement with the shank. An edge 27B, offset from the edge 25B, by engaging the shank S, limits the amount of tilting, before it reaches a degree when the toggle grip on the shank thus imposed would be released.

Various modifications in construction, mode of operation, method and use of an invention may and do occur to others, especially after benefiting from knowledge of such a disclosure as that herein presented of the principles involved, but the invention itself is not confined to the present showing.

I claim:

1. A collet of the type which comprises at least three gripping members of rigid material angularly spaced about a common axis arranged to tilt to provide toggle action, in which each of said members has gripping edge parallel with said axis and a tool-engaging projection laterally spaced from said gripping edge.

2. A collet of the type which comprises at least three gripping members of rigid material angularly spaced about a common axis arranged to tilt to provide toggle action, in which each of said members has gripping edge parallel with said axis and a tool-engaging projection laterally spaced from said gripping edge, with the radial distance of the projection more remote from the axis of the collet than the radial distance of the gripping edge from said axis.

3. A collet which comprises at least three gripping members of rigid material angularly spaced about a common axis arranged to tilt to provide toggle action, in which each of said members has gripping surface with an edge parallel with said axis and a tool-engaging rib laterally spaced from and parallel with its gripping edge with the radial distance of the rib more remote from the axis of the collet than the radial distance of the gripping edge from said axis.

4. A collet of the type which comprises at least three gripping members of rigid material angularly spaced about a common axis arranged to tilt to provide toggle action, in which each of said members has gripping edge parallel with said axis laterally spaced from one side of a radial plane through said axis and through the gripping member, and a tool-engaging projection laterally spaced farther from the same side of said plane with the radial distance of the projection more remote from the axis of the collet than the radial distance of the gripping edge from said axis.

5. A collet of the type which comprises at least three gripping members of rigid material angularly spaced about a common axis arranged to tilt to provide toggle action, in which each of said members has an inner gripping edge parallel with said axis laterally spaced from one side of a radial plane through said axis and through the gripping member, and a tool-engaging projection laterally spaced farther from the same side of said plane with the radial distance of the projection more remote from the axis of the collet than the radial distance of the gripping edge from said axis, each of said gripping members having an outer cam-engaging portion on the other side of said plane.

6. A collet of the type which comprises at least three gripping members of rigid material angularly spaced about a common axis arranged to tilt to provide toggle action, in which each of said members has an inner gripping edge parallel with said axis laterally spaced from one side of a radial plane through said axis and through the gripping member, and a tool-engaging projection laterally spaced farther from the same side of said plane with the radial distance of the projection more remote from the axis of the collet than the radial distance of the gripping edge from said axis, each of said gripping members having an outer cam-engaging edge on the other side of said plane.

7. A collet of the type which comprises at least three gripping members of rigid material angularly spaced about a common axis arranged to tilt to provide toggle action, in which each of said members has a pair of inner gripping edges parallel with said axis, and a pair of tool-engaging projections laterally spaced from opposite sides of its gripping edges, the radial distance of the projections being more remote from the axis of the collet than the radial distance of the gripping edges from said axis.

8. A collet of the type which comprises at least three gripping members of rigid material angularly spaced about a common axis arranged to tilt to provide toggle action, in which each of said members has a pair of inner gripping edges parallel with said axis, and a pair of tool-engaging ribs parallel to and laterally spaced from opposite sides of its gripping edges, the radial distance of the ribs being more remote from the axis of the collet than the radial distance of the gripping edges from said axis.

9. A collet of the type which comprises at least three gripping members of rigid material angularly spaced about a common axis arranged to tilt to provide toggle action, in which each of said members has gripping edge parallel with said axis and a tool-engaging projection laterally spaced from one side of said gripping edge, and is constructed with a channel on the other side of and parallel with its gripping edge to provide a clearance for the projection on the adjacent gripping member.

10. A collet of the type which comprises at least three flat-sided gripping members of rigid material angularly spaced about a common axis arranged to tilt to provide toggle action, interconnected by a resilient material forming foldable spanning struts between adjacent gripping members, in which each of said members has an inner gripping edge parallel with said axis and a tool-engaging projection laterally spaced from one side of a radial plane through said axis and passing between its sides, with the radial distance of the projection more remote from the axis of the collet than the radial distance of the gripping edge from said axis, each of said gripping members having an outer cam-engaging portion laterally spaced from the other side of said plane.

11. A collet of the type which comprises at least three gripping members of rigid material angularly spaced about a common axis arranged to tilt to provide toggle action, interconnected by a resilient material forming foldable spanning struts between adjacent gripping members, in which each of said members has an inner gripping edge parallel with said axis, and a pair of tool-engaging ribs laterally spaced from opposite sides of its gripping edge, the radial distance of the ribs being more remote from the axis of the collet than the radial distance of the gripping edge from said axis.

12. A collet of the type which comprises at least three gripping members of rigid material angularly spaced about a common axis arranged to tilt to provide toggle action, interconnected by a resilient material forming foldable spanning struts between adjacent gripping members, in which each of said members has an inner gripping edge parallel with said axis and a tool-engaging rib laterally spaced from one side of and parallel with its gripping edge, and is constructed with a channel on the other side of and parallel with its gripping edge to provide a clearance for the rib on the adjacent gripping member.

13. A collet of the type which comprises at least three flat-sided gripping members of rigid material angularly spaced about a common axis arranged to tilt to provide toggle action, interconnected by a resilient material forming foldable spanning struts between adjacent gripping members, in which each of said members has an inner gripping surface with an edge laterally offset from one side of a radial plane through said axis and intersecting said surface and a tool-engaging rib parallel with said edge, laterally spaced farther from the same side of said plane, with the radial distance of the rib more remote from the axis of the collet than the radial distance of the edge of the gripping surface from said axis.

14. A collet of the type which comprises at least three gripping members of rigid material angularly spaced about a common axis arranged to tilt to provide toggle action, interconnected by a resilient material forming foldable spanning struts between adjacent gripping members, in which each of said members has a pair of inner gripping edges parallel with said axis, and a pair of tool-engaging ribs laterally spaced from opposite sides of its gripping edges, the radial distance of the ribs being more remote from the axis of the collet than the radial distance of the gripping edges from said axis, each of said gripping members having outer cam-engaging portions laterally spaced from said plane.

ARTHUR MERRICK STONER.

REFERENCES CITED

The following references are of record in the file of this patent:

UNITED STATES PATENTS

| Number | Name | Date |
| --- | --- | --- |
| 1,594,515 | Bruhn | Aug. 3, 1926 |
| 1,898,264 | Proefke | Feb. 21, 1933 |
| 2,346,706 | Stoner | Apr. 18, 1944 |
| 2,346,707 | Stoner | Apr. 18, 1944 |